April 20, 1943.  W. A. WITHAM  2,317,161

METHOD OF FINISHING GEARS

Original Filed Jan. 28, 1936  4 Sheets-Sheet 1

INVENTOR
W. A. WITHAM
ATTORNEY

Inventor
W. A. WITHAM
Attorney

April 20, 1943.                W. A. WITHAM                 2,317,161
                        METHOD OF FINISHING GEARS
                Original Filed Jan. 28, 1936        4 Sheets-Sheet 4

INVENTOR
W. A. WITHAM
ATTORNEY

Patented Apr. 20, 1943

2,317,161

UNITED STATES PATENT OFFICE 2,317,161

METHOD OF FINISHING GEARS

Winfred A. Witham, East Rochester, N. Y., assignor to Gleason Works, Rochester, N. Y., a corporation of New York Original application January 28, 1936, Serial No. 61,237, now Patent No. 2,295,148, dated September 8, 1942. Divided and this application October 9, 1940, Serial No. 360,445

16 Claims. (Cl. 90—1.6)

The present invention relates to tools for and to methods of finishing gears and particularly to tools for and to methods of shaving spiral bevel and hypoid gears. The present application is a division of my co-pending application Serial No. 61,237, filed January 28, 1936, now Patent No. 2,295,148, of Sept. 8, 1942. It covers specifically the gear finishing process.

Efforts to shave bevel gears have heretofore been based upon the assumption that it is necessary to have some relative lengthwise sliding action between the tooth surfaces of the gear being shaved and the cutting edges of the shaving tools in order to have the cutting edges of the tool take shaving cuts. For this reason, it has been further assumed that the cutting edges of the shaving tools should extend up and down the profile of the teeth of the tool in a direction approximately at right angles to the direction of relative sliding. For shaving spiral bevel gears, therefore, the tools heretofore used have been made of hypoid gear form and have been generated to mesh in offset relation with the gear to be shaved so that when tool and gear were rotated in mesh, the relative sliding action would be obtained between the tool and gear which is characteristic of the mesh of a pair of hypoid gears. The production of a hypoid gear conjugate to a given spiral bevel gear is, however, a complicated kinematical problem and long processes of development have been required to produce satisfactory forms of hypoid shaving tools. As a result, the shaving of spiral bevel gears by such processes as have heretofore been proposed have not reached a commercial stage.

One object of the present invention is to provide a process for shaving gears and particularly for shaving bevel gears which will not depend upon or require relative lengthwise sliding between the tooth surfaces of the gear and the cutting edges of the shaving tool in order to effect the shaving action.

A further object of the invention is to provide a process for shaving spur, bevel and hypoid gears in which the shaving gear or tool and the gear to be shaved may be rotated together on relatively fixed centers.

Another object of the invention is to provide a process for shaving gears which can be performed on apparatus of a relatively simple type such as is now commonly used for the testing or burnishing of gears.

A further object of the invention is to provide a gear shaving process which will permit of the use of a shaving tool which will very closely approximate the form of a mate of the gear to be shaved so that the development of costly, special forms of shaving tools, such as heretofore required, may be eliminated.

A still further object of the invention is to provide a more efficient process for shaving gears, particularly bevel and hypoid gears.

Other objects of the invention will be apparent hereinafter from the specification and from the recital of the appended claims.

The present invention is based upon the discovery that, if a shaving tool is used which has its cutting edges inclined at a suitable relatively small angle to the lines of contact between the teeth of the shaving tool and the teeth of the gear to be shaved, it is not necessary to effect any relative lengthwise movement between the teeth of tool and gear, but that satisfactory shaving action may be achieved by simply rotating the tool and gear together. Where the cutting edges of the tool are properly inclined to the lines of contact, the shearing cut will be achieved that is required to produce efficient, smooth cutting action. Hence it is no longer necessary to employ a tool of hypoid gear form to shave a bevel gear. A bevel gear may be shaved with a tool of bevel gear form which meshes with the gear with its axis intersecting the axis of the gear. Further, a hypoid pinion may be shaved with a tool of tapered gear form whose axis has the same offset from the axis of the pinion as there is between the pinion and its mate hypoid gear when the pinion is in mesh with its mate.

When a pair of spiral bevel gears are rotated in mesh, the lines of contact between the mating tooth surfaces of the gears extend diagonally across the tooth surfaces from one end of the teeth to the other. Hence for shaving spiral bevel gears by the process of the present invention, a tool of spiral bevel gear form is used which has its cutting edges extending parallel to or substantially parallel to the root surface of its teeth. Such cutting edges are suitably inclined to the lines of contact between the tool and the gear to be shaved, and when gear and tool are run in mesh a clean, shearing cut is obtained. For shaving hypoid pinions, the tool used may be of hypoid gear form but it may also have its cutting edges extending parallel to its root lines since, as in the case of spiral bevels, the lines of contact between a pair of hypoid gears extend diagonally across the tooth surfaces from one end to the other.

Since the lines of contact between a pair of spiral bevel or a pair of hypoid gears extend in different directions on the two sides of the gear teeth, it may be desirable in some instances to have the cutting edges on one side of the teeth of the shaving tool extend in a somewhat different direction from the cutting edges on the other side of the teeth. This is not necessary in all cases, however, and other expedients may be adopted to compensate for this difference in inclination of the lines of contact as will be described more fully hereinafter.

Ordinarily tools are used whose tooth surfaces are of straight profile, that is, the tools are made by grooving the sides of the teeth of non-generated gears. Such a tool is easy to grind and to resharpen. The whole profile of a tooth can be ground simultaneously.

For shaving a spiral bevel gear or pinion, the shaving tool is meshed with the gear to be shaved with its axis intersecting the axis of the gear to be shaved and the tool and gear are rotated in mesh while being forced together under spring pressure or while a positive depthwise feed movement is effected between them to shave the full height of the teeth. For shaving hypoid gears, the tool may be meshed with the bear to be shaved with the same offset between the axis of tool and gear as is used between the gear, which is being shaved, and its mate when the pair are in mesh, and tool and gear are rotated together while relative depthwise movement is effected under spring load or positively.

The tool employed may have its teeth shaped to have full lengthwise contact with the teeth of the gear to be shaved or to have only partial lengthwise contact. In the former case, no other motions are required for finishing the gears other than rotation and depthwise movement. In the latter case, an additional movement lengthwise of the teeth of the work is required but merely to effect shaving along the whole length of the teeth.

Where rapid cutting action is desired, a shaving tool may be employed which has teeth not only grooved but also gashed transversely. With such a tool, the amount of pressure required to effect the shaving operation is materially reduced.

The invention is not restricted to shaving of spiral bevel and hypoid gears, but its principles may be applied to the shaving of other forms of gears also, such as spur gears.

Figure 6:
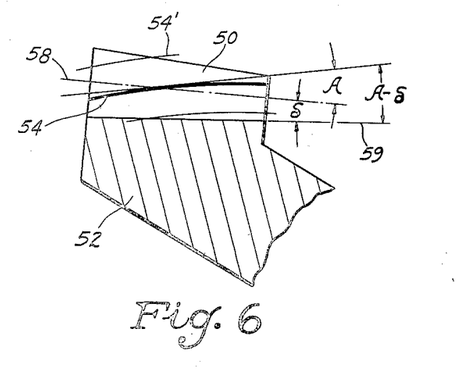
Figs. 6 and 7 are fragmentary axial sectional views of a tool, such as shown in Figs. 1 to 3 inclusive, and showing the relationship between the cutting edges of the drive side of the teeth of such a tool and the lines of contact between the tool and the gear, which is to be shaved, when the tool and gear are rotated in mesh.
Figure 8:
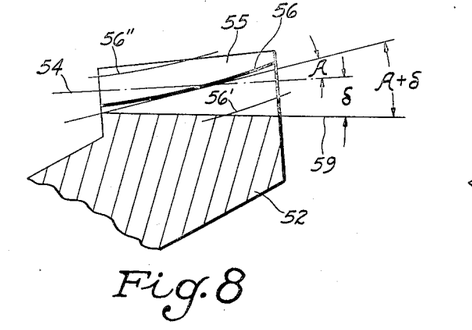
Figs. 8 and 9 are corresponding fragmentary axial sectional views of the tool illustrating diagrammatically the relationship between the lines of contact and the cutting edges on the coast side of the teeth of the tool when the cutting edges are arranged in the same way as on the drive side of the teeth, that is, parallel to the root lines of the tool.

When a pair of spiral bevel gears are rotated in mesh, the mating tooth surfaces of the pair contact, as already stated, along lines which are curved and which extend diagonally across the tooth surfaces of the gear. For the drive sides of the teeth, these lines extend in one direction and for the coast side of the teeth, they extend in the opposite direction. Thus, as shown in Fig. 6, the line of contact of the drive side of a tooth 50 of a spiral bevel gear 52 with the tooth surface of a mating pinion will, for one instant of mesh, extend along the curved line 54. For the coast side 55 of this same tooth of the gear 52, the line of contact, at the same instant, will be a curved line 56, such as shown in Fig. 8. As the gear and its mate roll together, these lines of contact will move across the tooth surface of the gear from top to bottom thereof. Thus, other positions of the lines of contact for other positions of mesh of gear and pinion are indicated at 54' and 54'' in Fig. 6 and at 56' and 56'' in Fig. 8.

Now to obtain satisfactory, smooth cutting action, where relative sliding is not to be relied on, I have found that the cutting edges of the shaving tool must be properly inclined to these lines of contact. Thus on a spiral bevel shaving gear, I have found that the cutting edges may have the same inclination to the lines of contact as the root lines of the teeth have to the lines of contact, and that correct cutting action may then be obtained without effecting any relative sliding action between the teeth of the tool and of the work. It will be noted, however, from Figs. 6 and 8 that the lines of contact have different inclinations to the root lines of the teeth for opposite sides of the teeth. Thus for the drive side of the teeth, as shown in Fig. 6, the lines of contact 54 are inclined at some angle $A$ to the pitch line 58 of the gear tooth and at an angle $A-\delta$ to the root line 59 of the teeth where $\delta$ is the dedendum angle. For the coast side of the teeth, however, as will be seen from Fig. 8, while the line of contact 56 has the same inclination $A$ to the pitch surface 58 as for the drive side of the teeth, the line of contact 56 is inclined to the root line 59 at an angle $A+\delta$.

For most automotive jobs, I have found that this difference in inclination of the lines of contact to the root line on opposite sides of the spiral bevel gear teeth is not great and can be disregarded and that, when cutting edges 60 and 61, respectively, are provided on the opposite sides of the teeth of a spiral bevel shaving gear 52, which are parallel to the root lines of the teeth of such a gear, a satisfactory shearing, cutting action is obtained. The angle between the cutting edges and the lines of contact may vary. I have found the angle may vary from 3° to 15° or more. Of course, when the cutting edges are parallel to the root line on both sides of the teeth of the shaving tool, it very materially simplifies the production of the tool. The only noticeable effect in use of such a shaving tool is that in some instances the shaving action may take place slightly faster on the coast side than on the drive side of the teeth.

Figure 10:
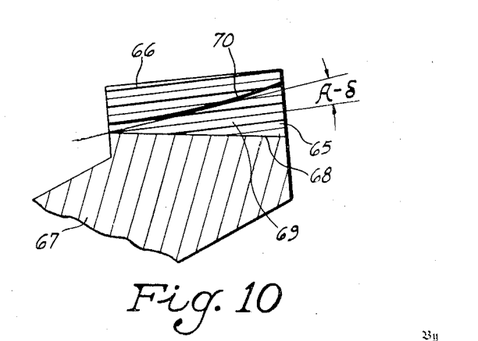
Fig. 10 is a fragmentary axial sectional view showing diagrammatically the relationship between the lines of contact and the cutting edges on the coast side of a tooth of a slightly modified form of the tool.

In those instances where it is desired that the shaving action proceed at the same rate on both sides of the teeth, a shaving gear may be employed which has cutting edges on the coast side that have the same inclination to the lines of contact for that side of the teeth as the cutting edges on the drive side of the teeth have to the lines of contact for the latter side of the teeth. The coast side of a tooth of such a tool is illustrated in Fig. 10. Here the cutting edges 65 on the coast side 66 of the tooth of a shaving gear 67 are shown inclined to the root line 68 of this gear at such an angle that the cutting edges make an angle $A-\delta$ with the lines of contact 70 for this side of the teeth. This angle $A-\delta$ is equal to the angle of inclination $(A-\delta)$ of the cutting edges 60 on the drive side of the teeth to the lines of contact 54 for that side of the teeth.

Figure 1:
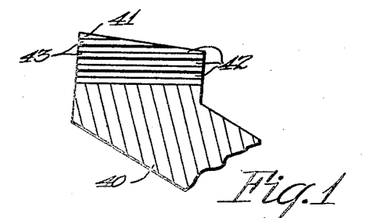
Fig. 1 is a fragmentary axial section and Fig. 2 a fragmentary plan view of a tool such as may be employed for shaving spiral bevel gears according to the method of the present invention.
Figure 2:
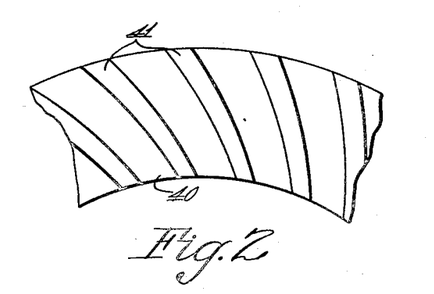

The cutting edges of the tool may be formed by taking a gear which will mesh with the gear to be shaved and grooving the side surfaces of the teeth of this gear. Thus, in Figs. 1 to 3 inclusive, I have shown a tool for shaving spiral bevel pinions. The tool itself is denoted at 40. It is formed from a standard spiral bevel gear of non-generated form having side tooth surfaces that are of straight profile and are conical surfaces of revolution. Grooves 42 are formed longitudinally in the sides of the teeth of the gear. These grooves are made parallel to the root lines of the teeth on both sides of the teeth. The lands 43 between the grooves lie in the original tooth surfaces of the gear and the lands are, therefore, of straight profile and lie in conical surfaces of revolution.

Figure 3:
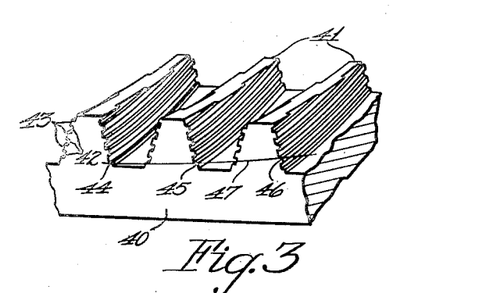
Fig. 3 is a fragmentary perspective view of this tool.

Preferably the grooves and lands are displaced with reference to one another on successive teeth of the tool so that the cutting edges formed by the grooves and lands will be displaced with reference to one another on successive teeth. In this way the effect of a great number of cutting edges will be obtained and a smoother surface will be secured. Preferably, the grooves and lands are so arranged on the corresponding sides of successive teeth as to be displaced spirally with reference with one another around the teeth of the gear. Such an arrangement is shown in Fig. 3 where the cutting edges 44, 45 and 46 of successive teeth of the tool 40 are shown arranged on a spiral 47. The lead of the spiral and the number of the spirals around the gear are determined by the form and character of the shaving gear and also by the quality of finish desired on the pinion to be shaved.

Up to this point, only tools for the shaving of spiral bevel gears and pinions have been specifically described. The invention is applicable, however, to the shaving of all types of gears, and the relationship, which has been discovered between the directions of the lines of contact and the cutting edges, must be observed for a shaving gear of any form if smooth, efficient cutting action is to be obtained without any relative sliding movement between the tool and the gear to be shaved.

Figure 9:
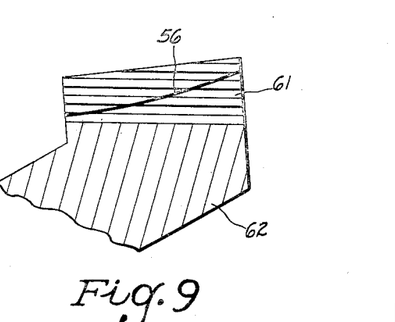
Figures 14, 15, 16, 17, 18:
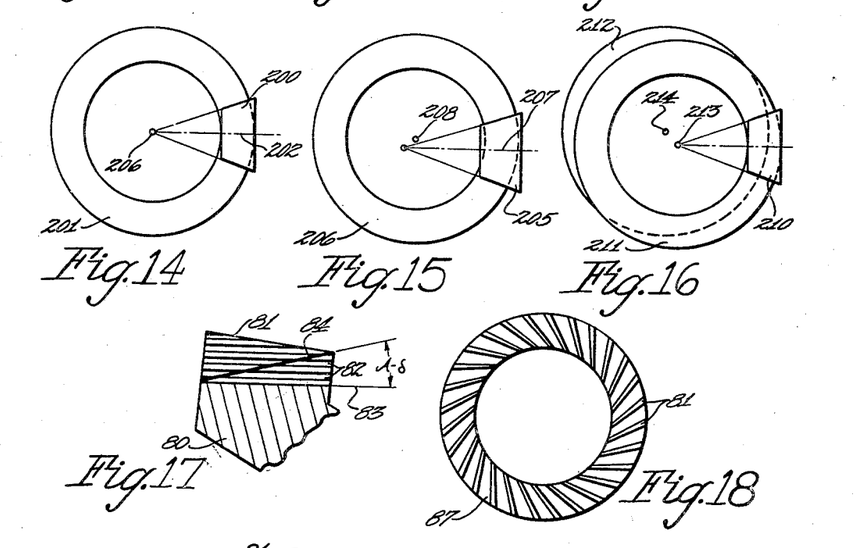
Fig. 14 is a view illustrating diagrammatically the method of shaving a bevel pinion with a tool gear constructed as illustrated in Fig. 12.
Fig. 15 is a corresponding diagrammatic view illustrating the method of shaving a hypoid pinion when a tool gear is used of the construction illustrated diagrammatically in Fig. 12.
Fig. 16 is a view illustrating diagrammatically the method of shaving a bevel pinion when a tool gear, such as is illustrated in Fig. 13, is employed as the shaving tool.
Figs. 17 and 18 are a fragmentary axial section and a plan view, respectively, showing a tool gear, such as may be employed for shaving skew bevel gears according to the present invention, and illustrating diagrammatically, on the drive side of the teeth, the preferred relationship between the cutting edges of such a tool and the lines of contact of the tool with the gear to be shaved.

For skew bevel gears, the lines of contact between the mating tooth surfaces of a pair of gears are straight but inclined to the root lines of the teeth on opposite sides of the teeth at the same angle as for spiral bevel gears of the same size. In Figs. 17 and 18, 80 denotes a tool such as may be employed in the process of the present invention for shaving skew bevel gears. The teeth 81 this tool have tooth surfaces grooved, as indicated at 82 in a direction parallel to the root lines 83 of the teeth. This tool gear is of the same size as the spiral bevel tool gear 52 shown in Fig. 7. Hence while its lines of contact 84 are straight, they will have the same inclination $A-\delta$ to the root lines 83 of the teeth as have the lines of contact 54 of the spiral bevel gear 52. The drive side only of the skew bevel tool gear is shown in Fig. 17. The grooves in the coast side of the teeth of this gear may also be made parallel to the root line of the teeth similar to the tool shown in Fig. 9, or they may be inclined to the root line so that the cutting edges have the same inclination to the lines of contact on the coast side of the teeth as on the drive side, corresponding therefore to the spiral bevel gear tool shown in Fig. 10.

Figure 19:
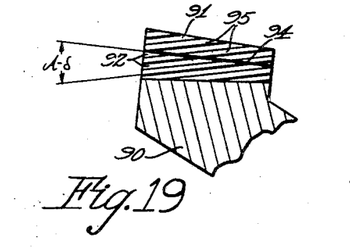
Figs. 19 and 20 are a fragmentary axial section and a plan view of a shaving tool for shaving straight bevel gears according to the process of the present invention, and illustrating the preferred relationship, on the drive side of the teeth between the cutting edges of such a tool and the lines of contact.
Figure 20:
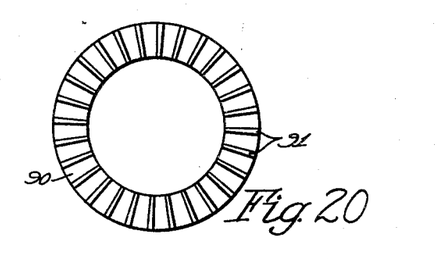

For shaving straight bevel gears, a tool will be used such as shown in Figs. 19 and 20. The lines of contact between the teeth of such a tool and the tooth surfaces of a straight bevel gear or pinion being shaved are straight lines which run to the gear apex of the tool. One of such lines is denoted at 94 in Fig. 19. To obtain efficient, smooth cutting action, the cutting edges of the tool gear 90 should be inclined to the lines of contact 94 at approximately the same angle as between the cutting edges and lines of contact in the case of the spiral bevel tool gears already described. This means that the teeth 91 of the shaving gear 90 should be grooved substantially as shown at 92 in Fig. 19 so as to obtain cutting edges 95 which are inclined to the lines of contact 94 at substantially an angle $A-\delta$ equal to the angle $A-\delta$ previously referred to.

Since straight bevel gears contact along the whole length of their tooth surfaces simultaneously and since portions of the tooth surfaces of a straight bevel shaving tool are necessarily cut away to provide the cutting edges, it is desirable that where a straight bevel shaving gear is employed, some means be provided to maintain correct timed relation of the tool and gear to be shaved as they rotate together. Such means may comprise a train of gearing, positively driving the tool and gear spindle in a timed relation corresponding to the ratio of a number of teeth of the tool gear and the gear to be shaved.

Figures 21, 22:
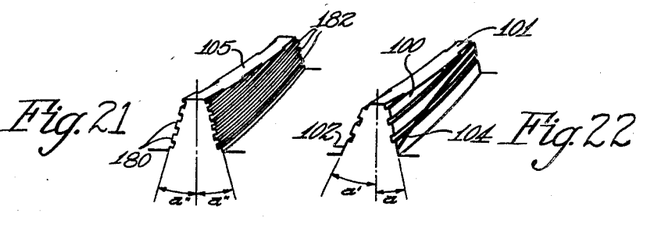
Fig. 21 is a fragmentary perspective view of a tooth of a modified form of shaving tool, such as may be employed for shaving spiral bevel pinions according to this invention.
Fig. 22 is a fragmentary perspective view of a tooth of a tool for shaving hypoid pinions according to the process of the present invention.

Fig. 22 shows a form of tool gear such as may be employed for shaving hypoid pinions by the process of the present invention. It is desirable in the case of such a tool to have the cutting edges extend parallel to the root lines of its teeth. To obtain the desired direction of the cutting edges, it is necessary, because of the offset relation of hypoid gears, to reduce the pressure angle on the drive side of the teeth of the hypoid shaving gear and to increase it on the coast side, as compared with the pressure angles used on the spiral bevel shaving gear. Thus, as shown in Fig. 22, the pressure angle $a$ of the drive side 100 of the tooth 101 of the hypoid shaving gear is considerably less than the pressure angle $a'$ of the coast side 102 of the tooth. This contrasts with the construction of the spiral bevel shaving gear shown in Fig. 21. In the case of the tooth shown in Fig. 21, the pressure angles $a''$ of the two sides of the tooth 105 are equal, although the included angle between opposite sides of the tooth may be the same as the included angle between opposite sides of the tooth 101 of the gear illustrated in Fig. 22.

Figure 7:
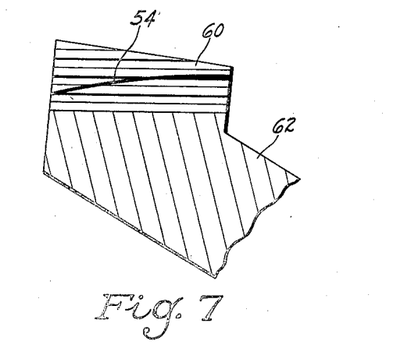

When a hypoid shaving tool constructed as shown in Fig. 22 is employed, the lines of contact 104 for the drive side of the teeth extend substantially in the same direction as the lines of contact 54 of the spiral bevel shaving gear shown in Fig. 7, and the lines of contact on the coast side of the teeth will extend substantially in the same direction as the lines of contact 56 of the coast side of this same spiral bevel shaving gear. Hence both sides of the teeth of a tool gear, such as shown in Fig. 22, may be formed with grooves which extend parallel to the root lines of the teeth, and such a tool gear will have substantially the same action when shaving a hypoid pinion as the spiral bevel shaving tool shown in Figs. 7 and 9 will have when shaving a spiral bevel pinion.

Figure 4:
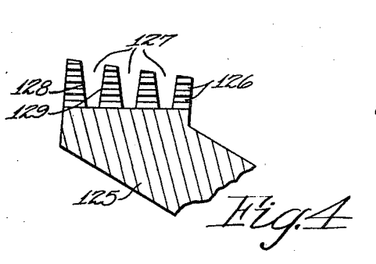
Fig. 4 is a fragmentary axial section and Fig. 5 a fragmentary plan view of a modified form of tool such as may be employed in practicing the present invention.
Figure 5:
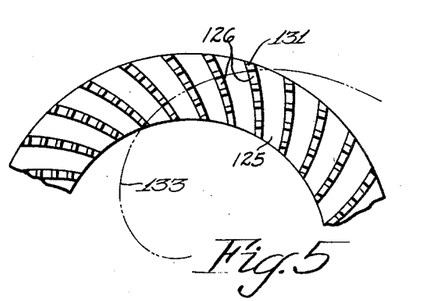

The grooves may be cut in the shaving tools in any desired manner. While in the drawings, these grooves extend along straight lines, it is possible to have them extend also along curved lines. The grooves may be of any desired shape in cross section, they may have their sides perpendicular to the sides of the teeth, or parallel to the top lands of the teeth, or they may have any other suitable direction as described more particularly in my parent application No. 61,237.

Where quite rapid cutting action is desired, shaving tools may be employed which are cross-gashed in addition to being grooved, as shown in Figs. 4 and 5. Here a shaving tool 125 is illustrated which has its teeth 131 grooved, as indicated at 126, to provide longitudinal cutting edges parallel to the root lines of the teeth. This shaving tool also has its teeth gashed transversely, as indicated at 127, to provide profile cutting edges 128 and 129. The gashes 127 extend entirely through the teeth and are, in the form shown, V-shaped so that the cutting edges 128 and 129 are slightly inclined to the pitch surface of the tool. The cross gashes may be arranged on a spiral as indicated at 133 in Fig. 5, or on circular arcs or have any other direction as desired. They may be normal to the teeth or extend at any desired angle relative thereto.

Where the teeth of the shaving tools are both grooved and gashed, mere displacement of the grooves on different teeth is not sufficient to insure complete coverage and complete finishing of the tooth surfaces of the gear and pinion being shaved. The grooves must be displaced according to a definite law as will now be described.

Figure 23:
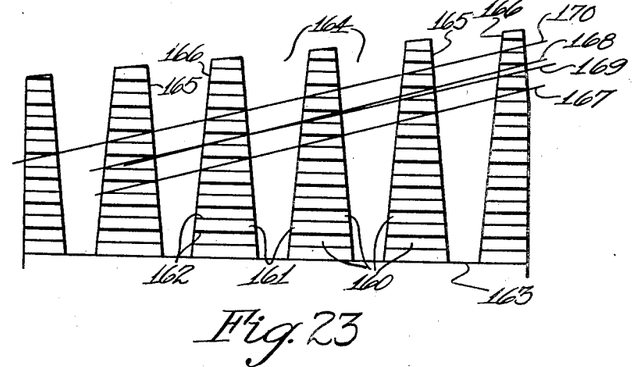
Figs. 23 and 24 are diagrammatic views illustrating the principles which should be followed in determining the relationship between the grooves and gashes of a tool, such as shown in Fig. 4, in order to have the cutting edges of such a tool shave the whole of the tooth surface of a pinion.

Fig. 23 is a more or less diagrammatic side elevation of a tooth of a shaving gear. This tooth is provided with longitudinal grooves 160 extending parallel to the root line 163 of the tooth. Between the grooves 160 are lands 161 whose side edges 162 form the longitudinal cutting edges of the tool. The tooth is also gashed transversely by V-shaped grooves 164 which form profile cutting edges 165 and 166.

In the tool illustrated in Fig. 23, the grooves 160 and lands 161 are arranged on a spiral which has a lead equal to the pitch of the grooves so that the grooves are displaced on successive teeth of the tool a distance equal to the pitch of the grooves divided by the number of teeth of the tool. With this construction, the bottom right hand corner of the lands 161 of the tool lie on a helical line 167 and the corresponding corners of the lands next highest on the profile of the teeth lie in a helical line 168. Diagonally opposite corners of these two series of lands lie on the lines 169 and 170, respectively. From Fig. 23 it will be noted that the lines 169 and 168 diverge toward the right hand or large end of the tooth. In other words, there is a space between the lines 168, 169 where there are no cutting edges and hence where there would be no shaving action. If a shaving tool were used, then, having grooves and gashes arranged in the manner shown in Fig. 23, the gear being operated upon would not be completely shaved.

Figure 24:
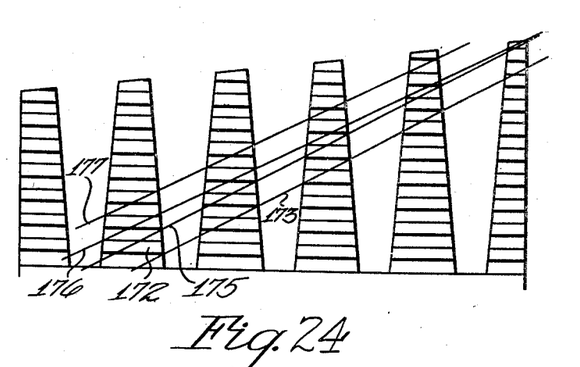

If the tool has its grooves arranged, however, as shown in Fig. 24, the shaving action will be complete. Here the lead of the spirals of the grooves and lands is equal to twice the pitch of the grooves. Thus the lower right hand corners of one series of lands 172 are arranged on a helix 173 and the corresponding corners of the next higher series of lands lie in a helix 175. The diagonally opposite left hand corners of these two series of lands lie in helices 176 and 177, respectively. It will be noted that the helix 175 completely overlaps the helix 176. Hence, the cutting edges of the shaving tool will completely cover the tooth surfaces of the gear to be shaved and completely shave the same.

Complete coverage of the tooth surfaces of the gear can be obtained, then, by displacing the gashes from tooth to tooth on the shaving gear a distance equal to the pitch of the gashes divided by the number of teeth in the gear, and by displacing the grooves a distance equal to twice the pitch of the grooves divided by the number of teeth in the gear, or, still more broadly, by displacing the grooves from tooth to tooth a distance equal to a multiple of the pitch of the grooves divided by the number of teeth in the shaving tool.

In a tool to be used according to the process of the present invention, grooves and lands may be of equal width and the same size grooves and lands may be used on both sides of the teeth, or grooves and lands may be of different widths and different size grooves may be used on opposite sides of the teeth. The narrower the lands, the smaller the unit pressure required to shave and the faster the shaving action under a given pressure. Where the shaving action is too rapid on the coast side of the teeth as compared with the drive side, the action may be equalized by making the lands wider on the coast side of the teeth than on the drive side. Such construction is illustrated in Fig. 21. Here the lands 180 for the coast side of the tooth 105 of the shaving tool are wider than the lands 182 of the drive side of the tooth.

Ordinarily the tool gear used will have teeth of greater chordal thickness than the teeth of the mate of the gear which is being shaved so that the tool and the gear to be shaved may mesh without any backlash and the tool may cut simultaneously on both sides of the tooth spaces of the gear being shaved.

Figure 11:
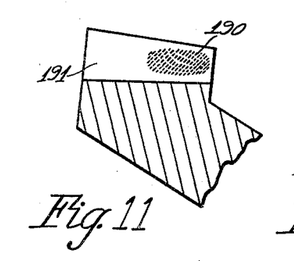
Fig. 11 is a fragmentary axial sectional view of an automotive drive gear and showing diagrammatically a typical tooth bearing between such a gear and its mate when the pair are in mesh.

The radii of curvature of the mating tooth surfaces of a pair of automotive drive gears are usually selected so that they mismatch and so that when the pair of gears are meshed in correct position without load, the bearing or tooth contact will be concentrated at the small end of the gear teeth as indicated by the shaded portion 190 of the tooth 191 shown in Fig. 11.

For shaving spiral bevel or hypoid gears according to the process of the present invention, shaving tools are employed whose tooth surfaces are curved longitudinally either to match the tooth surfaces of the gear to be shaved along the whole length of such tooth surfaces, or the tooth surfaces of the shaving gear are so curved longitudinally that the teeth of the shaving gear and the tooth surfaces of the gear to be shaved will have localized contact at the center of the tooth surfaces.

Figure 12:
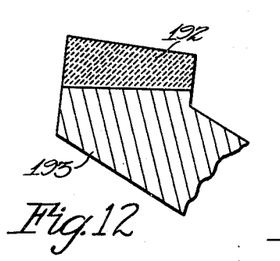
Fig. 12 is a fragmentary axial sectional view showing diagrammatically by way of contrast the tooth bearing between a tool gear and a pinion, which is to be shaved, when a tool gear is used whose teeth have full lengthwise contact with the teeth of the pinion.

Fig. 12 illustrates the tooth contact of a shaving gear of the first type. Here the shaving gear 193 has tooth surfaces longitudinally curved in such way that their radii match exactly the radii of the mating tooth surfaces of the gear to be shaved. Hence the teeth of the shaving gear 193 will have full length bearing contact, as indicated by the shaded surface 192, with the tooth surfaces of the gear to be shaved.

Figure 13:
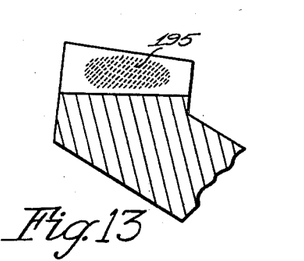
Fig. 13 is a corresponding fragmentary axial sectional view showing the tooth bearing between the tool gear and the pinion being shaved when a tool gear is employed whose teeth have localized contact with the teeth of the pinion.

Fig. 13 illustrates diagrammatically the construction of a shaving gear of the second type described. Here the shaving gear has tooth surfaces so curved longitudinally as to be tangent to the meshing tooth surfaces of the gear to be shaved at points midway the length of the tooth surfaces. Hence the tooth bearing, as indicated in shaded lines at 195, will be localized midway the length of the tooth surface.

When a shaving tool, such as illustrated in Fig. 12, is employed for shaving spiral bevel or hypoid gears, the shaving gear and the gear to be shaved are run together on fixed centers without any motion other than a feed motion in the direction of tooth depth. Thus, as shown in Fig. 14, when a bevel pinion 200 is to be shaved with a bevel shaving gear 201 constructed as shown in Fig. 12, the pinion and shaving tool will be meshed like an ordinary pair of bevel gears with the axis 202 of the pinion intersecting the axis 203 of the shaving gear, and the pinion and shaving gear will be rotated together on their axes while a relative depthwise feed movement is produced between them. Either gear or pinion may act as the driver.

Likewise when a hypoid pinion 205 is to be shaved with a hypoid shaving gear 206 whose teeth are cut to have a full length bearing with the tooth surfaces of the pinion, the pinion and gear will be meshed on fixed centers with the axis 207 offset from the axis 208 of the shaving tool a distance equal to the offset between the axis of the pinion and its mate gear when in mesh. For shaving the pinion 205, the pinion 205 and the tool gear 206 are rotated in mesh upon their respective axes while a simple feed movement depthwise of the teeth is produced to shave the teeth of the pinion for their full height.

When a tool gear is employed, whether it be a bevel or a hypoid tool gear, which is constructed, as shown in Fig. 13, to have a localized tooth bearing with the gear to be shaved, then it is necessary to produce a motion lengthwise of the teeth of the gear to be shaved, in addition to the rotary motions of tool and gear, in order to shave the teeth of the gear for its full length. For this purpose the shaving operation may be effected on a machine such as described in a patent to Slade, No. 1,796,484 of March 17, 1931. The method of operation of this machine is illustrated diagrammatically in Fig. 26. 210 denotes the hypoid pinion to be shaved and 211 is the shaving tool. The shaving gear 211 is secured to a spindle, which is mounted eccentrically in an oscillatable carrier 212, with the axis 213 of the shaving gear offset from the axis 214 of the carrier. The pinion may act as the driver, and, as the pinion and shaving gear rotate in mesh, the carrier 212 is oscillated to move the tooth bearing or contact of the shaving gear from one end of the pinion teeth to the other, thereby shaving the whole length of the tooth surfaces of the pinion. A relative depthwise feed movement may be produced manually between the shaving gear and pinion during rotation, or the tool and pinion may be forced into depth under spring pressure.

For the shaving of spur gears according to this invention, a tool will be employed which has its cutting edges extending longitudinally of its teeth but inclined to the pitch and root lines of the teeth in accordance with the principles above set forth. For the shaving of helical gears, the tool used should have its cutting edges extending parallel to the root and pitch lines of its teeth, for the teeth of helical gears contact along lines inclined to the pitch and root lines of the teeth. With such tools, spur and helical gears, respectively, may be shaved by simple rotation of tool and work together.

While several different embodiments of the invention have been illustrated and described, the invention is capable of still further modification, and this application is intended to cover any adaptations, uses, or embodiments of the invention, following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. The method of finishing one member of a pair of tapered gears which comprises employing a tool of tapered gear form that has the opposite sides of its teeth grooved longitudinally to provide cutting edges which extend longitudinally of the teeth, all of which are inclined to the tops of its teeth on both sides of its teeth and to the lines of contact between said teeth and the tooth surfaces of the gear to be shaved when the tool and gear are rotated in mesh, positioning the tool in engagement with the gear so that the tool and gear axes have the same relative positions as the axes of the gear being finished and of its mate when the pair are in mesh, and rotating the tool in engagement with the gear while effecting a relative depthwise movement between the tool and gear to finish the teeth of the gear to the desired depth.

2. The method of finishing one member of a pair of longitudinally curved tooth tapered gears which comprises employing a tool of tapered gear form that has longitudinally curved teeth and that has the sides of its teeth grooved longitudinally to provide cutting edges which extend longitudinally of the teeth parallel to the root lines of the teeth on both sides of the teeth, positioning the tool in engagement with the gear so that the tool and gear axes have the same relative positions as the axes of the gear being finished and of its mate when the pair are in mesh, and rotating the tool in engagement with the gear while effecting a relative depthwise movement between the tool and gear to finish the teeth of the gear to the desired depth.

3. The method of finishing one member of a pair of longitudinally curved tooth tapered gears which comprises employing a tool of tapered gear form that has longitudinally curved teeth and has cutting edges formed on the sides of its teeth by alternate grooves and lands that extend longitudinally of the teeth parallel to the root lines of the teeth, and which has wider lands on one side of its teeth than on the other, positioning the tool in engagement with the gear so that the tool and gear axes have the same relative positions as the axes of the gear being finished and of its mate when the pair are in mesh, and rotating said tool in engagement with the gear while effecting a relative depthwise movement between the tool and gear to finish the teeth of the gear to the desired depth.

4. The method of finishing a longitudinally curved tooth tapered gear which comprises employing a tool of tapered gear form that has longitudinally curved teeth whose side surfaces are conical and that has the sides of its teeth grooved longitudinally to provide cutting edges which extend longitudinally of the teeth parallel to the root lines of the teeth on both sides of the teeth, positioning said tool in engagement with the work so that the axis of the tool is angularly disposed to and intersects the axis of the work, and rotating the tool and work in engagement while effecting a relative depthwise movement between the tool and work to finish the teeth of the gear to the desired depth.

5. The method of finishing a longitudinally curved tooth tapered gear which comprises employing a tool of tapered gear form that has longitudinally curved teeth and that has cutting edges formed in the sides of its teeth by alternate grooves and lands that extend longitudinally of its teeth parallel to the root lines of the teeth, and which has wider lands on the coast sides of its teeth than on the drive sides thereof, positioning said tool in engagement with the gear so that the axis of the tool is angularly disposed to and intersects the axis of the gear, and rotating the tool in engagement with the gear while effecting a relative depthwise movement between the tool and gear to finish the teeth of the gear to the desired depth.

6. The method of finishing one member of a pair of longitudinally curved tooth hypoid gears which comprises employing a tool of tapered gear form that has longitudinally curved teeth whose opposite sides have different pressure angles and have cutting edges formed on both sides thereof that extend longitudinally of the teeth parallel to the root lines of the teeth, positioning said tool in engagement with the gear so that the axis of the tool is angularly disposed to the axis of the gear and offset from the axis of the gear the same distance as the offset between the axes of the pair of gears when in mesh, and rotating the tool in engagement with the gear while effecting a relative depthwise movement between the tool and gear to finish the teeth of the gear to the desired depth.

7. The method of finishing a longitudinally curved tooth tapered gear which comprises employing a tool of tapered gear form that has longitudinally curved teeth whose opposite sides have different radii of curvature from the mating sides of the gear to be finished and are so curved longitudinally that they contact with the tooth surfaces of the gear to be finished midway the length of said tooth surfaces, and rotating said tool in engagement with the gear while producing a relative movement between the tool and gear longitudinally of the teeth of the gear, and effecting a relative depthwise movement between the tool and gear to finish the teeth of the gear to the desired depth.

8. The method of finishing a longitudinally curved tooth tapered gear which comprises employing a tool of tapered gear form that has longitudinally curved teeth whose opposite sides have radii of curvature different from the mating sides of the gear to be finished and are so curved longitudinally that they will contact with the tooth surfaces of the gear midway of the length of said tooth surfaces, and positioning said tool in engagement with the gear so that the axis of the tool is angularly disposed to and intersects the axis of the gear, and rotating said tool and gear in engagement while producing a relative movement between the tool and gear about an axis offset from but parallel to the axis of the gear, and effecting a depthwise movement between the tool and gear to finish the teeth of the gear to the desired depth.

9. The method of finishing a longitudinally curved tooth tapered gear which comprises employing a tool of tapered gear form that has longitudinally curved teeth whose opposite sides have the same radii of curvature as the meshing tooth surfaces of the gear to be finished and are grooved to form cutting edges which extend longitudinally of the teeth and are equally inclined on opposite sides of the teeth to the pitch line of said tool, and rotating the tool in engagement with the gear while effecting a relative depthwise movement between the tool and gear to finish the gear to the desired depth.

10. The method of finishing a longitudinally curved tooth tapered gear which comprises employing a tool of tapered gear form that has longitudinally curved teeth whose opposite sides have radii of curvature different from the mating sides of the gear to be finished and are so curved longitudinally that they contact with the tooth surfaces of the gear midway of the length of said teeth, and are grooved to form cutting edges which extend longitudinally of the teeth and which are inclined to the lines of contact between said teeth and the mating tooth surfaces of the gear to be shaved, and rotating said tool in engagement with the gear while producing a relative movement between the tool and gear about an axis offset from but parallel to the axis of the gear, and effecting a depthwise movement between the tool and gear to finish the teeth of the gear to the desired depth.

11. The method of finishing a longitudinally curved tooth bevel gear which comprises employing a tool of tapered gear form that has longitudinally curved teeth whose opposite sides have radii of curvature different from the mating sides of the gear to be finished and are so curved longitudinally that they will contact with the tooth surfaces of the gear midway of the length of said tooth surfaces, and are grooved to form cutting edges which extend longitudinally of the teeth and which are inclined to the lines of contact between said teeth and the tooth surfaces of the gear to be finished when the tool and gear are rotated in mesh, and positioning said tool in engagement with the gear so that the axis of the tool is angularly disposed to and intersects the axis of the gear, and rotating the tool and gear in engagement while producing a relative movement between the tool and gear longitudinally of the teeth of the gear, and effecting a relative depthwise movement between the tool and gear to finish the teeth of the gear to the desired depth.

12. The method of finishing a bevel gear which comprises employing a tool of tapered gear form that has its pitch surface inclined at other than 180° to its axis and which has teeth of straight profile and that has cutting edges formed on both sides of its teeth which extend longitudinally of the teeth, all of which are inclined at equal angles to the lines of contact between the opposite sides of the teeth and the mating tooth surfaces of the gear to be finished when the tool and gear are rotated in mesh, and positioning said tool in engagement with the gear with the axis of the tool intersecting the axis of the gear and angularly disposed thereto, and rotating the tool and gear in engagement while effecting a relative depthwise movement between the tool and gear to finish the teeth of the gear to the desired depth.

13. The method of shaving a longitudinally curved tooth tapered gear which comprises employing a tool of tapered gear form which has its pitch surface inclined to its axis at other than 180° and which has longitudinally curved teeth whose sides are conical and have radii of curvature different from the ridii of curvature of the sides of the teeth of the gear to be shaved and which has cutting edges formed on both sides of its teeth that are inclined to the lines of contact between said teeth and the teeth of the gear to be finished when the tool and gear are rotated in mesh, and rotating said tool in engagement with the gear while producing a relative movement between the tool and gear lengthwise of the teeth of the gear, and effecting a relative movement between the tool and gear depthwise of said teeth.

14. The method of finishing a bevel gear which comprises employing a tool of tapered gear form that has radially arranged teeth which have cutting edges formed on their opposite sides that extend longitudinally of the teeth and that are inclined to both the top and root lines of the teeth, positioning said tool in engagement with the gear so that the axis of the tool is angularly disposed to and intersects the axis of the gear, and rotating the tool and gear in mesh while effecting a relative depthwise movement between the tool and gear to finish the teeth of the gear to the desired depth.

15. The method of finishing one member of a pair of longitudinally curved tooth tapered gears which comprises employing a tool of tapered gear form that has longitudinally curved teeth whose opposite sides are conical and have cutting edges formed thereon that extend longitudinally of the teeth and that are inclined to the lines of contact between said teeth and the teeth of the gear to be finished when the tool and gear are rotated in mesh, positioning the tool in engagement with the gear so that the tool and gear axes have the same relative positions as the axes of the gear being finished and its mate when the pair are in mesh, and rotating the tool and gear in engagement while effecting a relative depthwise feed movement between the tool and gear to finish the teeth of the gear to the desired depth.

16. The method of finishing one member of a pair of longitudinally curved tooth tapered gears which comprises employing a tool of tapered gear form which has its pitch surface inclined to its axis at other than 180° and which has longitudinally curved teeth whose sides are conical and which has cutting edges formed on both sides of its teeth by alternate grooves and lands that extend longitudinally of the teeth parallel to the root lines of the teeth, and which has wider lands on the longitudinally concave sides of its teeth than on the longitudinally convex sides thereof, positioning said tool and gear in engagement so that the axes of tool and gear have the same relative positions as the axes of the gear and its mate when the pair are in mesh, and rotating said tool in engagement with the gear while effecting a relative depthwise movement between the tool and gear to finish the teeth of the gear to the desired depth.

WINFRED A. WITHAM.